(12) United States Patent
Fjerstad

(10) Patent No.: US 7,906,749 B2
(45) Date of Patent: Mar. 15, 2011

(54) SYSTEM AND METHOD FOR DEPLOYMENT AND ACTUATION

(75) Inventor: Erik A. Fjerstad, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 404 days.

(21) Appl. No.: 11/942,099

(22) Filed: Nov. 19, 2007

(65) Prior Publication Data

US 2009/0126523 A1  May 21, 2009

(51) Int. Cl.
| | |
|---|---|
| *F42B 15/01* | (2006.01) |
| *B64C 5/10* | (2006.01) |
| *B64C 9/00* | (2006.01) |
| *B64C 13/00* | (2006.01) |
| *F42B 15/00* | (2006.01) |
| *B64C 5/00* | (2006.01) |

(52) U.S. Cl. ....... 244/3.24; 244/3.1; 244/3.27; 244/3.28; 244/75.1; 244/99.2; 244/99.3

(58) Field of Classification Search ............... 244/34 R, 244/35 R, 45 R, 46–49, 75.1, 220, 234, 235, 244/3.1–3.3, 99.2–99.9; 74/20–62, 640, 74/412 R, 422, 423, 424, 99 R, 109; 418/181
See application file for complete search history.

(56) References Cited

U.S. PATENT DOCUMENTS

| | | | | |
|---|---|---|---|---|
| 2,574,916 | A | * | 11/1951 | Wright .................... 244/235 |
| 2,821,924 | A | * | 2/1958 | Hansen et al. ............ 244/3.28 |
| 3,002,500 | A | * | 10/1961 | Diesing et al. ............ 418/181 |
| 3,489,039 | A | | 1/1970 | Beaupere |
| 4,336,914 | A | * | 6/1982 | Thomson .................. 244/46 |
| 6,347,782 | B1 | * | 2/2002 | Gill .......................... 74/109 |
| 6,726,147 | B1 | | 4/2004 | Perini et al. |
| 7,185,847 | B1 | * | 3/2007 | Bouchard et al. .......... 244/46 |

* cited by examiner

*Primary Examiner* — Bernarr E Gregory
(74) *Attorney, Agent, or Firm* — Renner, Otto, Boisselle & Sklar, LLP

(57) ABSTRACT

A mechanical deployment and actuation system may comprise a rotation module, a pinion module, a rack module, and a bevel module. The rotation module may be configured to couple to a housing and rotate about the principal axis of the rotation module relative to the housing. The pinion module may be configured to couple to the rotation module and selectively rotate about the principal axis of the pinion module relative to the rotation module. The rack module may be configured to dynamically couple to the pinion module and translate along the principal axis of the rack module in response to rotation of the pinion module. The bevel module may be configured to couple to the rotation module and selectively rotate the rotation module, wherein rotation of the rotation module rotates about the principal axis of the rotation module, the rack module, and the pinion module.

27 Claims, 9 Drawing Sheets

SYSTEM AND METHOD FOR DEPLOYMENT AND ACTUATION

FIELD OF INVENTION

The present invention generally concerns systems and methods for deployment and/or actuation; and more particularly, representative and exemplary embodiments of the present invention generally relate to systems, devices and methods relating to deployment and/or actuation of a control surface, or to actuate and/or deploy any suitable systems and/or devices.

BACKGROUND OF INVENTION

Mechanical systems may be configured to provide motion according to a specified design. For example, gears may be configured to mesh such that rotation of a first gear imparts a conforming rotation of the second gear. As another example, a rack and pinion gear assembly may be configured to mesh such that rotation of the pinion gear imparts a conforming translation of the rack. Such systems may be employed in a variety of applications including robotics, transportation devices, power systems, household appliances, and the like.

An exemplary application of a mechanical system is in the deployment and actuation of a control surface system for a projectile. For a projectile having a control surface, there are at least two design issues: selective deployment and/or selective actuation of the control surface. As to deployment, in many applications it is desirable to stow the control surface at some point during the operation of the projectile. For example, a projectile may be configured to be fired from an artillery barrel. In order to maximize the kinetic energy imparted to an artillery fired projectile, the projectile may be configured with an outer diameter such that the projectile is substantially flush with the interior surface of the barrel. Because control surfaces are frequently configured to extend beyond the outer diameter of the projectile, it is may be necessary to stow the control surface and deploy it after the projectile is in flight.

As to actuation, a control surface may be configured to actuate in flight to modify the trajectory of the projectile. For example, a control surface may be configured to rotate about an axis substantially normal to the longitudinal axis of symmetry of the projectile in order to modify the surface characteristics of the projectile. Accordingly, a system may be implemented to actuate the control surface to a desired position.

Complex mechanical systems have been developed to achieve these deployment and actuation applications. For example, many control surface systems include pyrotechnic actuators configured to provide irreversible control surface implementations. As another example, many control surface systems include feedback mechanisms to selectively align a control surface. Such systems may increase the complexity of hardware and software components and may increase power consumption. Complexity may increase the mass of the control system as well as provide an opportunity for failure of components.

SUMMARY OF THE INVENTION

In various representative aspects, a mechanical deployment and actuation system may comprise a rotation module, a pinion module, a rack module, and a bevel module. The rotation module may be configured to couple to a housing and rotate about the principal axis of the rotation module relative to the housing. The pinion module may be configured to couple to the rotation module and selectively rotate about the principal axis of the pinion module relative to the rotation module. The rack module may be configured to dynamically couple to the pinion module and translate along the principal axis of the rack module in response to rotation of the pinion module. The bevel module may be configured to couple to the rotation module and selectively rotate the rotation module, wherein rotation of the rotation module occurs about the principal axis of the rotation module, the rack module, and the pinion module.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the detailed description, wherein:

Figure 1:
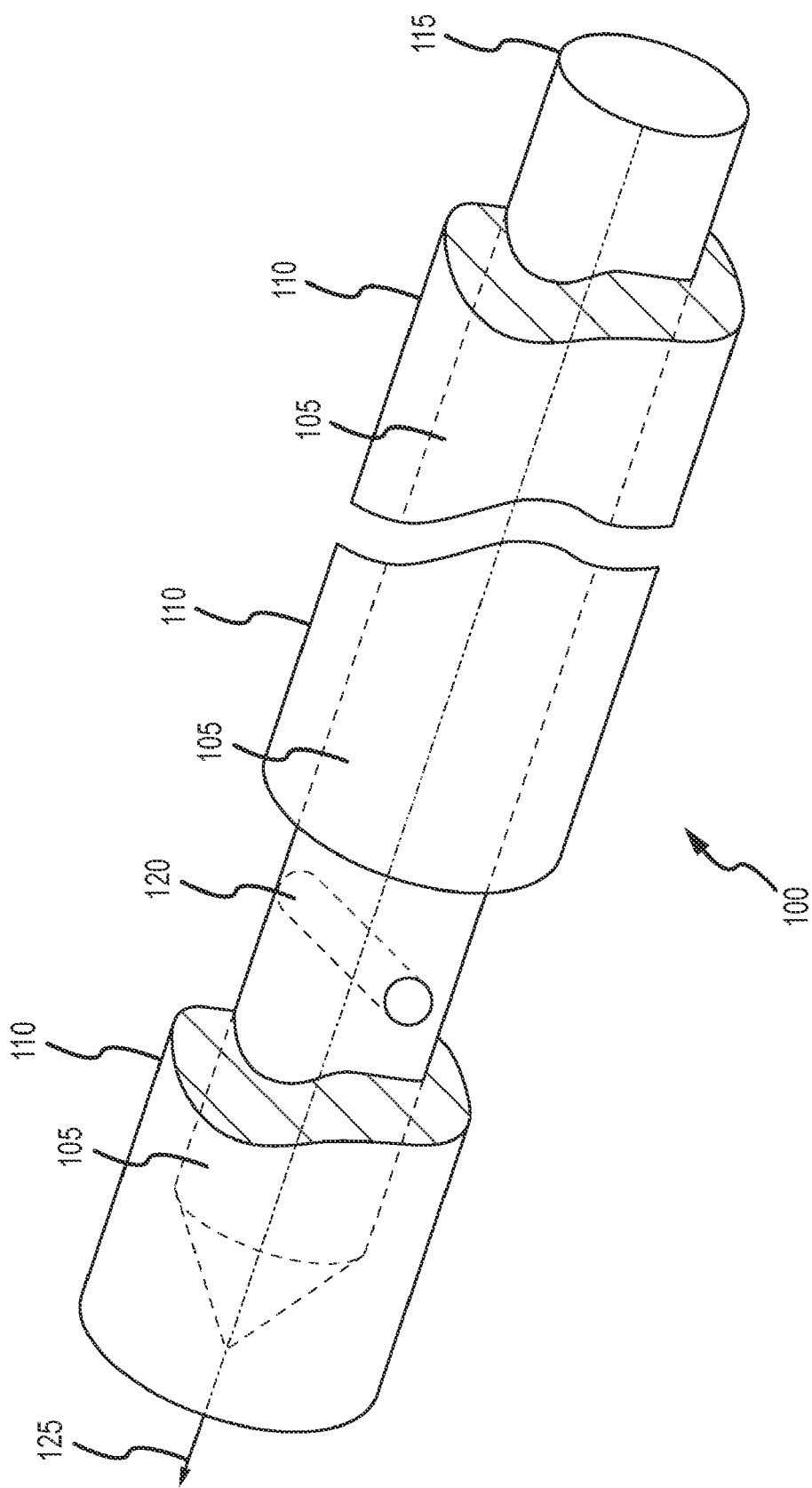
FIG. 1 representatively illustrates a projectile in accordance with an exemplary embodiment of the present invention.

Elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Moreover, the terms "front", "back", "top", "bottom", "over", "under", "forward", "aft", and the like in the Description and/or in the claims, if any, are generally employed for descriptive purposes and not necessarily for comprehensively describing exclusive relative position. Any of the preceding terms so used may be interchanged under appropriate circumstances such that various embodiments of the invention described herein, for example, may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventors' conception of the best mode, and are not intended to limit the scope, applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

Various representative implementations of the present invention may be applied to any system including and/or comprising a mechanical system. Certain representative implementations may include, for example: as a mechanical system used to actuate and/or deploy a control surface; as a mechanical system used to actuate and/or deploy any suitable systems and/or devices; within robotics applications; combinations thereof and/or the like.

As used herein, the terms "actuation", or any variation or combination thereof, are generally intended to describe a change in the state of a body in response to a signal, especially selective rotation about an axis.

As used herein, the terms "couple", or any variation or combination thereof, are generally intended to describe a configuration of at least two bodies wherein each body is not rendered inoperable for its intended purpose, such as, for example: a plug slidably connected within a cylindrical tube, a fastener attached to a structure configured to receive the fastener; and/or the like.

As used herein, the terms "deployment", or any variation or combination thereof, are generally intended to describe a change in the state of a body in response to a signal, especially selective translation along an axis.

As used herein, the terms "dynamically couple", or any variation or combination thereof, are generally intended to describe a couple between elements wherein the coupled elements are configured for synchronized rotation and/or translation by virtue of the couple, wherein the coupled elements at least partially maintain the couple, such as, for example: a first gear meshed with a second gear; and/or the like.

As used herein the terms "high friction surface", or any variation or combination thereof, are generally intended to describe an interface between at least two surfaces having a coefficient of friction sufficient to dynamically couple the at least two surfaces. For example, a pair of cylindrical structures may be aligned to have parallel longitudinal axes such that the annular surfaces meet along an interface. The surfaces have a high friction surface if counterclockwise rotation of one cylinder imparts a corresponding clockwise rotation of the other. Alternatively, if one cylinder substantially independently rotates while in contact with other cylinder, there is no high friction surface.

As used herein, the terms "in response to", or any variation or combination thereof, are generally intended to describe a cause and effect relationship between at least two elements, such as translation of the shaft of a solenoid in response to a potential difference, rotation of a first gear in response to rotation of a meshed second gear; and/or the like.

As used herein, the terms "mechanical", or any variation or combination thereof, are generally intended to describe a system having at least one moving part on a macroscale, such as a plurality of gears, in contradistinction to a solid state system.

A detailed description of an exemplary application, namely a deployment and/or actuation system for a control surface, is provided as a specific enabling disclosure that may be generalized to any application of the disclosed system, device and method for deployment and/or actuation in accordance with various embodiments of the present invention.

In various embodiments in accordance with the present invention, a projectile may include a mechanical system configured to deploy and actuate a control surface. For example, FIG. 1 representatively illustrates a projectile system 100 in accordance with an exemplary embodiment of the present invention. Projectile system 100 may comprise a projectile 105 configured for translation, a launch housing 110 configured to facilitate launch of projectile 105, a drive system 115 configured to impart kinetic energy to projectile 105, and a control surface module 120 configured to selectively modify the trajectory of launched projectile 105.

Projectile 105 may comprise any system that is configured to translate and/or rotate. Projectile 105 may be configured to operate in a specific environment. For example, projectile 105 may be configured to translate and/or rotate through outer space, through air, through liquid water, through combinations thereof, and/or the like. Projectile 105 may be configured to translate and/or rotate in response to various systems and/or devices. For example, projectile 105 may imparted with kinetic energy by way of an artillery barrel. As another example, projectile 105 may be imparted with kinetic energy by way of internal devices such as a gyroscope, a stream of ejecta, a jet engine, propellers, combinations thereof, and/or the like.

Projectile 105 may comprise various materials. The design parameters relating to selection of a material comprising projectile 105 may relate to the operating environments and/or operating conditions of projectile 105. For example, if projectile 105 is to operate for an extended period of time in salt water, it may be desirable to include materials configured for operation in such environment. As another example, if projectile 105 is to operate at supersonic speeds, it may be desirable to include materials configured for these operating conditions. Taking into account these and/or other design considerations, projectile 105 may comprise any suitable material including alloys, polymers, ceramics, cellulose, combinations thereof, and/or the like.

Projectile 105 may be suitably configured in various geometries and dimensions. The design parameters relating to the geometries of projectile 105 may relate to the operating environments, operating conditions, and/or materials of projectile 105. For example, if projectile 105 is an aircraft, the geometries and dimensions of projectile 105 may be substantially dissimilar to those of a projectile 105 that is a torpedo. As another example, if projectile 105 is configured to carry explosive ordnance, the geometries and dimensions of projectile 105 may be substantially dissimilar to those of a projectile 105 that is configured to carry reconnaissance equipment. Taking into account these and/or other design considerations, projectile 105 may comprise any suitable dimensions and any suitable geometries including a substantially conic section, substantially ellipsoidal, substantially polyhedral, substantially toroidal, substantially cylindrical, combinations thereof, and/or the like.

Projectile 105 may comprise any suitable systems, structures, and devices. For example, projectile 105 may comprise materials including explosive ordnance, reconnaissance equipment, communications equipment, and/or a person or persons. As another example, projectile 105 may be configured to operate with external systems, such as satellite positioning systems.

Projectile 105 may be suitably configured in various embodiments. For example, projectile 105 may be a device that is configured to translate through air such as an aircraft, bomb, missile, or shell. As another example, projectile 105 may be a device such as a depth charge, submarine, or torpedo that is configured to translate through water. As yet another example, projectile 105 may be a device such as a satellite, spaceship, or space station configured for operation in extraterrestrial applications such as deployment and/or actuation of a solar panel. As yet another embodiment, projectile 105 may be broadly defined to include a device such as a turbine, a waterwheel, a propeller and/or a windmill that is configured to rotate in applications such as deployment and/or actuation of a surface in response to high velocity conditions.

Launch housing 110 may comprise a launch tube or similar structure suitably adapted to house, protect, stabilize, etc., one or more projectiles 105 prior to and/or during launch. Launch housing 110 may comprise a structure which is distinct from the projectile 105, where projectile 105 is propelled by a drive system 115. A launch housing 110 may substantially concentrically conform around projectile 105 and constrain translation of projectile 105 to changes in position in a single dimension coincident with the principal axis 125 of the projectile 105 or drive system 115. Principal axis 125 may correspond to a straight line that is coincident with the drive system's 115 highest order of symmetry (alternatively or conjunctively, principal axis 125 may be coincident with drive system's 115 vector of deployment), for example, a straight line joining the apex and the center of the base of a cone, a straight line passing through the center of a circle, a straight line passing through the centers of the circular faces of a cylinder, and/or the like.

Launch housing 110 may be suitably configured for re-use such that launch housing 110 generally maintains its ability to support projectiles 105 through multiple mass ejection cycles of deployment. Design considerations, such as the operating temperature of ejected mass, if any, may influence the dimensions and selection of materials for fabrication of launch housing 110. Launch housing 110 may have a shape other than that of a cylindrical tube and may be suitably configured to provide support for a variety of projectile 105 geometries. Launch housing 110 may include other features, such as structural support members, sighting mechanisms, electronics, and/or the like.

Drive system 115 may be configured to impart kinetic energy to projectile 105. For example, drive system 115 may be a system configured to provide a stream of ejecta, such as a rocket engine. As another example, drive system 115 may be a surface of projectile 105 configured to receive a force from the interaction of an artillery barrel with a cartridge coupled to projectile 105. As yet another example, drive system 115 may be configured to both receive a force from a launch device such as an artillery barrel and provide a stream of ejecta during flight of projectile 105.

Drive system 115 may be suitably configured in various geometries, dimensions, and materials. Design considerations for drive system 115 include intended operation of projectile 105, operating environment of projectile 105, maximum allowable mass of projectile 105, maximum allowable dimensions of projectile 105, combinations thereof, and/or the like. For example, drive system 115 may be configured for use with a particular launch housing 110, a specified impulse oil launch, the internal geometry of launch housing 110, and/or the internal dimensions of launch housing 110. Taking into account these and other design considerations, drive system 115 may comprise any suitable geometries including a substantially conic section, substantially ellipsoidal, substantially polyhedral, substantially toroidal, substantially cylindrical, combinations thereof, and/or the like. Drive system 115 may also comprise any suitable dimensions and any suitable materials including alloys, polymers, ceramics, cellulose, combinations thereof, and/or tie like.

Drive system 115 may comprise any suitable systems, structures, and devices. For example drive system 115 may comprise a plurality of contoured fins configured to direct ejecta emitted from drive system 115 and thereby modify the trajectory of drive system 115. As another example, drive system 115 may be actuated to achieve a specified trajectory at the direction of a control system configured to selectively direct drive system 115. As yet another example, drive system 115 may be powered by fuel and such fuel may be stored in proximity to drive system 115.

Control surface module 120 may be configured to deploy and/or actuate at least one control surface. For example, control surface module 120 may be configured to deploy and/or actuate a control surface in response to a signal from a control system. The deployed control surface may be configured to modify the surface characteristics of projectile 105 such that the trajectory of projectile 105 is thereby modified. Control surface module 120 may be configured to modify the disposition of a control surface such that the control surface module 120 may be configured to provide various surface characteristics rather than binary alternatives. For example, control surface module 120 may be configured to both deploy a control surface and actuate the control surface to achieve various surface characteristics.

Figure 2:
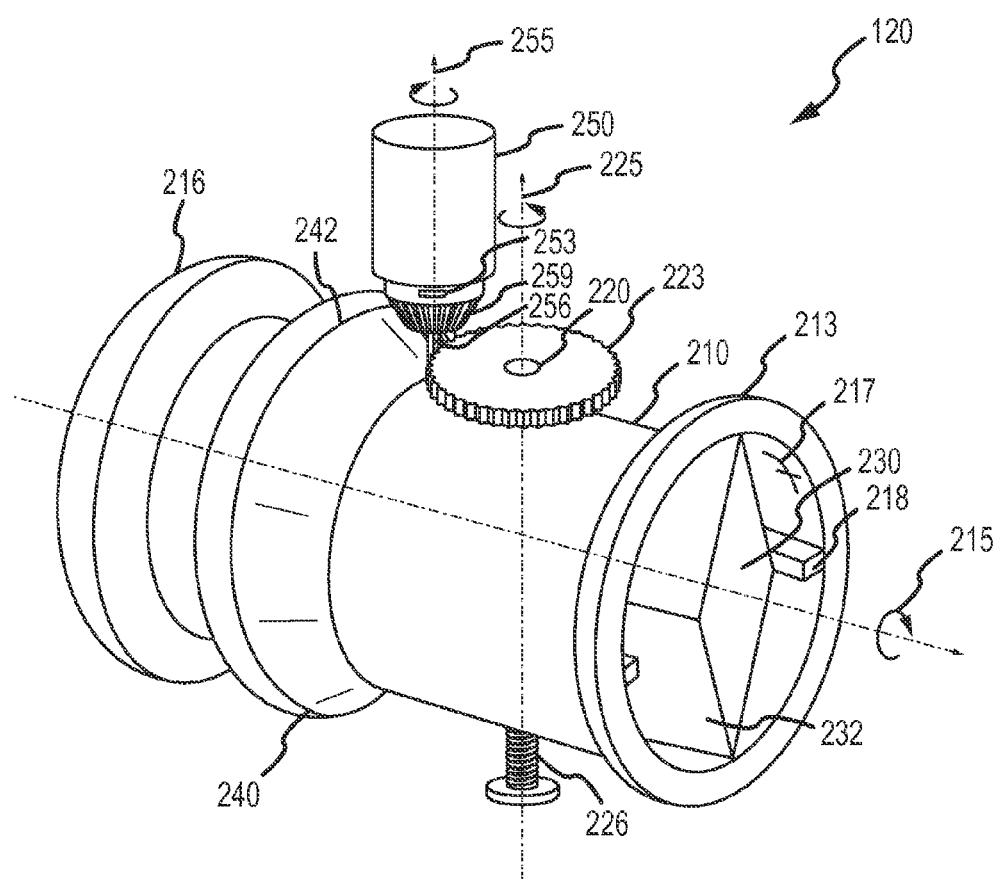
FIG. 2 representatively illustrates a deployment and/or actuation system in an initial state in accordance with an exemplary embodiment of the present invention.

As generally depicted in FIG. 2, a representative embodiment of the present invention provides an orthographic view for a control surface module 120 in an initial state. Control surface module 120 may comprise a rotation module 210, a pinion module 220, a rack module 230, and a bevel module 240. Rotation module 210 may be configured to couple to a housing such that rotation module 210 is configured to rotate about the principal axis 215 of rotation module 210 relative to the housing. Pinion module 220 may be configured to couple to rotation module 210 such that pinion module 220 is configured to rotate about the principal axis 225 of pinion module 220 relative to rotation module 210. Rack module 230 may be configured to dynamically couple to pinion module 220 such that rack module 230 is configured to translate substantially parallel to the principal axis 215 of rotation module 210. Bevel module 240 may be configured to couple to rotation module 210 such that bevel module 240 is configured to selectively rotate rotation module 210. Further, rotation module 210, pinion module 220, and rack module 230 may be aligned such that rotation of rotation module 210 by bevel module 240 at least partially rotates about the principal axis 215 of rotation module 210, pinion module 220 and rack module 230. Rotation of both pinion module 220 and bevel module 240 may be imparted by corresponding dynamic couples with a rotational drive system 250.

Rotation module 210 may be suitably configured in various embodiments. Rotation module 210 may be configured to provide an axis of rotation and/or translation with respect to a housing. For example, the principal axis 215 of rotation module 210 may be substantially normal to the principal axis 125 of projectile 105. As another example, the principal axis 215 of rotation module 210 may be at an angle to the principal axis 125 of projectile 105. Accordingly, rotation module 210 may be suitably configured to provide an axis of rotation and/or translation 215 with respect to projectile 105.

Rotation module 210 may be coupled to a housing in various embodiments. For example, rotation of rotation module 210 relative to the housing may be facilitated by a bearing 213/216. Bearing 213/216 may be a low friction surface disposed substantially annularly with respect to rotation module 210, a distinct portion of rotation module 210 being configured for operation with a portion of housing and/or a distinct piece configured to couple to rotation module 210. For example, bearing 213/216 may comprise a ball bearing, a roller bearing, grease, combinations thereof, and/or the like. Bearing 213/216 may be configured to restrict movement of rotation module 210 relative to the housing. For example, bearing 213/216 may restrict translation and rotation of rotation module 210 to rotation about the principal axis 215 of rotation module 210. In another embodiment, rotation module 210 may be configured to selectively translate about its principal axis 215 relative to projectile 105.

Rotation module 210 may comprise any suitable dimensions, geometry, and material. Design considerations include the projectile 105 into which rotation module 210 is to be installed, the properties of the various modules 220/230/240/250 with which rotation module 210 is to operate, the operating conditions for the projectile 105, combinations thereof, and/or the like. For example, rotation module 210 may comprise at least one of a substantially hollow cylinder and a substantially solid cylinder. As another example, rotation module 210 may comprise a cylinder having a length of 3.500 inches, a maximum outer diameter of 1.500 inches, and an inner diameter of 1.250 inches. Taking into account these and other design considerations, rotation module 210 may comprise any suitable geometries including a substantially conic section, substantially ellipsoidal, substantially polyhedral, substantially toroidal, substantially cylindrical, combinations thereof, and/or the like, any suitable dimensions and any suitable materials including alloys, polymers, ceramics, cellulose, combinations thereof, and/or the like.

Pinion module 220 may be suitably configured in various embodiments. Pinion module 220 may be configured to provide an axis of rotation and/or translation 225. Pinion module 220 may be variously disposed relative to the principal axis 215 of rotation module 210. For example, pinion module 220 may be disposed substantially normal to the principal axis 215 of rotation module 210. As another example, pinion module 220 may be disposed at an angle to the principal axis 215 of rotation module 210. Design considerations relating to the alignment of pinion module 220 and rotation module 210 include the meshing as between pinion module 220 and rack module 230, the meshing as between pinion module 220 and rotational drive system 250, the meshing as between rotation module 210 and bevel module 240, the meshing as between bevel module 240 and rotational drive system 250, combinations thereof, and/or the like.

Pinion module 220 may be coupled to rotation module 210 in various embodiments. For example, pinion module 220 may be configured to selectively rotate about the principal axis 225 of pinion module 220 relative to rotation module 210. The axis of rotation 225 of pinion module 220 may be provided by rotation module 210. For example, rotation module 210 may comprise a plurality of notches defining a plurality of holes configured to receive pinion module 220. The holes may be configured to restrict rotation and/or translation of pinion module 220 about and/or along an axis 225 defined by the holes. The holes may be disposed such that the axis 225 of pinion module 220 is coincident with a chord of rotation module 210. As another example, pinion module 220 may comprise a plurality of bearings configured to restrict rotation and/or translation of pinion module 220 about and/or along axis 225 defined by the bearings. The bearings may be further configured to couple to rotation module 210 such that pinion module 220 is substantially restricted with respect to rotation and/or translation of pinion module 220 about and/or along axis 225 defined by the rotation module 210. Any suitable dimensions, geometries, and materials may be employed in coupling rotation module 210 to pinion module 220.

Pinion module 220 may comprise any suitable dimensions, geometries, and materials. Design considerations include the projectile 105 into which pinion module 220 is to be installed, the properties of the various modules 210/230/240/250 with which pinion module 220 is to operate, the operating conditions for the projectile 105, combinations thereof, and/or the like. For example, pinion module 220 may comprise at least one of a substantially hollow cylinder and a substantially solid cylinder. As another example, pinion module 220 may comprise a cylindrical spur 223 configured to couple with rotational drive system 250 having a thickness of 0.100 inches and a diameter of 1.634 inches. Pinion module 220 may further comprise a cylindrical shaft having a length of 3.200 inches and a diameter of 0.200 inches. Taking into account these and other design considerations, pinion module 220 may comprise any suitable geometries including a substantially conic section, substantially ellipsoidal, substantially polyhedral, substantially toroidal, substantially cylindrical, combinations thereof, and/or the like. The pinion module 220 may also comprise any suitable dimensions and any suitable materials including alloys, polymers, ceramics, cellulose, combinations thereof, and/or the like.

Rack module 230 may be suitably configured in various embodiments. Rack module 230 may be configured to provide a control surface 232 in response to deployment of rack module 230 along the internal surface 217 of rotation module 210. Rack module 230 may be deployed via dynamic coupling with pinion module 220.

Figure 3:
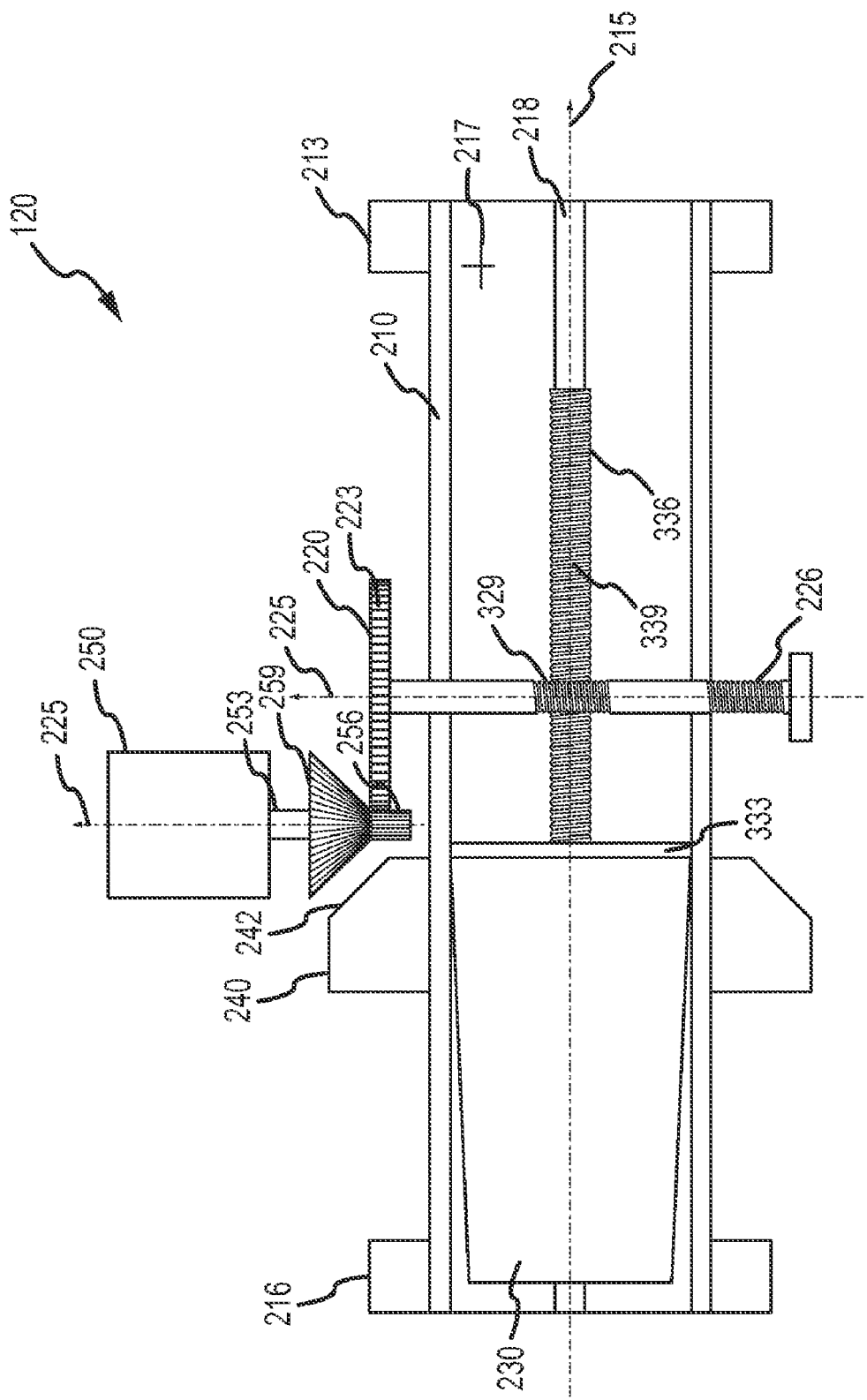
FIG. 3 representatively illustrates a cross-section view of a deployment and/or actuation system in an initial state in accordance with an exemplary embodiment of the present invention.

As generally depicted in FIG. 3, a representative embodiment of the present invention provides a cross-section view for a control surface module 120 in an initial state. Rack module 230 may comprise a control surface 232, a plug 333, a rack body 336 and a rack surface 339. Control surface 232 may comprise any suitable surface including a canard, an aero-surface, combinations thereof, and/or the like. Control surface 232 may be configured to extend beyond the length of rotation module 210 when rack module 230 is fully deployed.

The principal axis of rack module 230 may be coincident with the longitudinal axis of symmetry of rack module 230. For example, rotation module 230 may be disposed such that a principal axis of rack module 230 corresponding to the primary axis of symmetry of rack module 230 is substantially parallel to the principal axis 215 of rotation module 210. Design considerations relating to the alignment of rack module 230 and rotation module 210 include the meshing as between pinion module 220 and rack module 230, the meshing as between pinion module 220 and rotational drive system 250, the meshing as between rotation module 210 and bevel module 240, the meshing as between bevel module 240 and rotational drive system 250, combinations thereof, and/or the like.

Rack module 230 may comprise any suitable dimensions, geometries, and materials. Design considerations include the projectile 105 into which rack module 230 is to be installed, the properties of the various modules 210/220/240/250 with which rack module 230 is to operate, the operating conditions for the projectile 105, combinations thereof, and/or the like. For example, rack module 230 may comprise a canard having a length of 1.500 inches, a width of 1.00 inches, and a maximum thickness of 0.144 inches. As another example, plug 333 may have a diameter of 1.200 inches. Taking into account these and other design considerations, rack module 230 may comprise any suitable geometries including a substantially conic section, substantially ellipsoidal, substantially polyhedral, substantially toroidal, substantially cylindrical, combinations thereof, and/or the like. Rack module 230 may also comprise any suitable dimensions and any suitable materials including alloys, polymers, ceramics, cellulose, combinations thereof, and/or the like.

Rack module 230 may be configured to deploy in response to rotation of rotation module 220. For example, pinion module 220 may comprise pinion surface 329 configured to dynamically couple with rack surface 339. The axis of translation of rack module 230 may be defined by rotation module 210 as by conformance of a notched portion of plug 333 with a longitudinal key 218 disposed along the internal surface 217 of rotation module 210.

The dynamic couple between pinion module 220 and rack module 230 may be suitably configured in various embodiments. Pinion surface 329 may comprise an annular surface of pinion module 220 and rack surface 339 may comprise a corresponding substantially planar surface of rack module 230. Pinion surface 329 and rack surface 339 may comprise corresponding gear teeth and/or corresponding high friction surfaces. In various embodiments, rotational drive system 250 may be suitably configured to selectively translate rack module 230 by virtue of the dynamic couple between rotational drive system 250 and pinion module and the dynamic couple between pinion module 220 and rack module 230.

Dimensions, geometries, and materials for pinion surface 229 and/or rack surface 339 may be suitably configured for a given application. For example, in an application featuring rapid rotation of pinion module 220, durability requirements may favor more robust designs and materials. As another example, in an application having a high sensitivity to vibration, the design may be configured to minimize vibration due to dynamic coupling. Taking into account these and other design considerations, pinion surface 229 and/or rack surface 339 may comprise any suitable geometries including a substantially conic section, substantially ellipsoidal, substantially polyhedral, substantially toroidal, substantially cylindrical, combinations thereof, and/or the like. Pinion surface 229 and/or rack surface 339 may also comprise any suitable dimensions and any suitable materials including alloys, polymers, ceramics, cellulose, combinations thereof, and/or the like.

Rack module 230 may be configured to actuate in response to rotation of rotation module 210. For example, plug 333 may be configured to substantially conform with the interior surface 217 of rotation module 210. Plug 333 may be configured to lock and restrain rotation of rack module 230 about the principal axis 215 of rotation module 210 via a notch in plug 333 configured to conform to a longitudinal key 218 disposed along the interior surface 217 of rotation module 210. Accordingly, plug 333 may substantially define the disposition of rack module 230 relative to the principal axis 215 of rotation module 210.

Plug 333 may additionally be configured to provide gun hardening of control surface module 120. Additionally, plug 333 may be configured to act as a shock absorber, provide a weather seal, prevent contamination of pinion module 220 within rotation module 210, combinations thereof, and/or the like. Materials as well as geometric and/or dimensional designs may be implemented to achieve these capabilities.

In the event that multiple rack modules 230 are to be implemented within rotation module 210, the rack surface body 336 of one rack module 230 may be variously configured for operation with the plug 333 of another rack module 230. For example, in an initial state, the rack surface body 336 of each rack module 230 may be configured to fit within a recessed portion of the other rack module 230. As another example, in an initial state, the rack surface body 336 of each rack module 230 may be configured to extend through the plug 333 of the other rack module 230 by virtue of a hole in each plug 333 corresponding to the dimensions of each rack surface body 336.

Through translation of rack module 230, a control surface 232 such as a canard may be selectively implemented. Control surface 232 may comprise a distinct portion of rack module 230 configured to protrude from rotation module 210 when rack module 230 is at least partially deployed. Control surface 232 may be configured to extend beyond the effective diameter of projectile 105 thereby modifying the surface characteristics of projectile 105. For example, control surface 232 may be configured to modify the resultant coefficient of drag and/or the resultant coefficient of lift of projectile 105. Accordingly, by deploying and/or actuating control surface 232, the trajectory of projectile 105 may be modified. The extent to which control surface 232 modifies the surface characteristics of projectile 105 may relate to the overall change in the effective area, A, by introduction of control surface 232 according to:

$$F_D = \frac{1}{2}\rho v^2 A C_D \text{ and/or } F_L = \frac{1}{2}\rho v^2 A C_L,$$

Where $F_D$ is the force of drag, $\rho$ is the density of fluid through which the surface is passing, v is the velocity of the surface relative to the fluid, A is the effective area, $C_D$ is the drag coefficient, $F_L$ is the force of lift, and $C_L$ is the lift coefficient of projectile 105.

Bevel module 240 may be suitably configured in various embodiments. Bevel module 240 may be configured to couple to rotation module 210 and rotate rotation module 210 about the principal axis 215 of rotation module 210. For example, bevel module 240 may be disposed at least partially substantially annularly about the exterior surface of rotation module 210. Design considerations relating to the alignment of bevel module 240 and rotation module 210 include the meshing as between bevel module 240 and rotational drive module 250, the meshing as between pinion module 220 and rotational drive system 250, the meshing as between rotation module 210 and bevel module 240, combinations thereof, and/or the like.

Bevel module 240 may comprise any suitable dimensions, geometries, and materials. Design considerations include the projectile 105 into which bevel module 240 is to be installed, the properties of the various modules 210/220/230/250 with which bevel module 240 is to operate, the operating conditions for the projectile 105, combinations thereof, and/or the like. For example, bevel module may extend 0.575 inches beyond the outer diameter of rotation module 210 and/or include a beveled surface formed by a 0.325 inch chamfer of the bevel module 240 along the edge facing rotational drive system 250. Taking into account these and other design considerations, bevel module 240 may comprise any suitable geometries including a substantially conic section, substantially ellipsoidal, substantially polyhedral, substantially toroidal, substantially cylindrical, combinations thereof, and/or the like. Bevel module 240 may also comprise any suitable dimensions and any suitable materials including alloys, polymers, ceramics, cellulose, combinations thereof, and/or the like.

The couple between bevel module 240 and rotation module 210 may be suitably configured in various embodiments. For example, bevel module 240 may be a substantially fixed structure disposed at least partially annularly around the exterior surface of rotation module 210. In such an embodiment, rotation module 210 may be configured to rotate about its principal axis 215 according to the dynamic couple between beveled surface 242 and second surface 259 of rotational drive system 250. As another example, bevel module 240 may be an at least partially freely rotating structure disposed at least partially annularly around the exterior surface of rotation module 210. Bevel module 240 may comprise a circumferential slot and rotation module 210 may comprise a pin configured to be constrained by the circumferential slot. In such an embodiment, rotation module 210 may be configure to rotate about its principal axis 215 according to the dynamic couple between beveled surface 242 and second surface 259 of rotational drive system 250 after a pin imparts a torque on rotation module 210 in response to contact with a corresponding portion of the slot.

Rotational drive system 250 may be suitably configured in various embodiments. For example rotational drive system 250 may comprise a shaft 253 with a principal axis 255. Shaft 253 may comprise a first surface 256 configured to dynamically couple with rotation module 220 and a second surface 259 configured to dynamically couple with bevel module 240. As another example, rotational drive system 250 may comprise a shaft 253 configured to dynamically couple with both bevel module 240 and pinion module 220 as by a high friction surface couple between shaft 253 and bevel module 240 as well as the couple between shaft 253 and pinion module 250.

Rotational drive system 250 may comprise an electric motor and/or a driveshaft configured for operation with the components 210/220/230/240 of control surface module 120 within projectile 105. Accordingly, rotational drive system 250 may comprise a power source configured to power drive shaft 253, a control system configured to selectively rotate drive shaft 253, a Hall Effect sensor configured to selectively rotate shaft 253, an optical encoder configured to monitor rotation of shaft 253, combinations thereof, and/or the like. Design considerations relating to rotational drive system 250 include the power needed to deploy and/or actuate control surface module 120, the operating conditions of projectile 105, the maximum allowable dimensions and/or mass of rotational drive module 250, combinations thereof, and/or the like.

Figure 4:
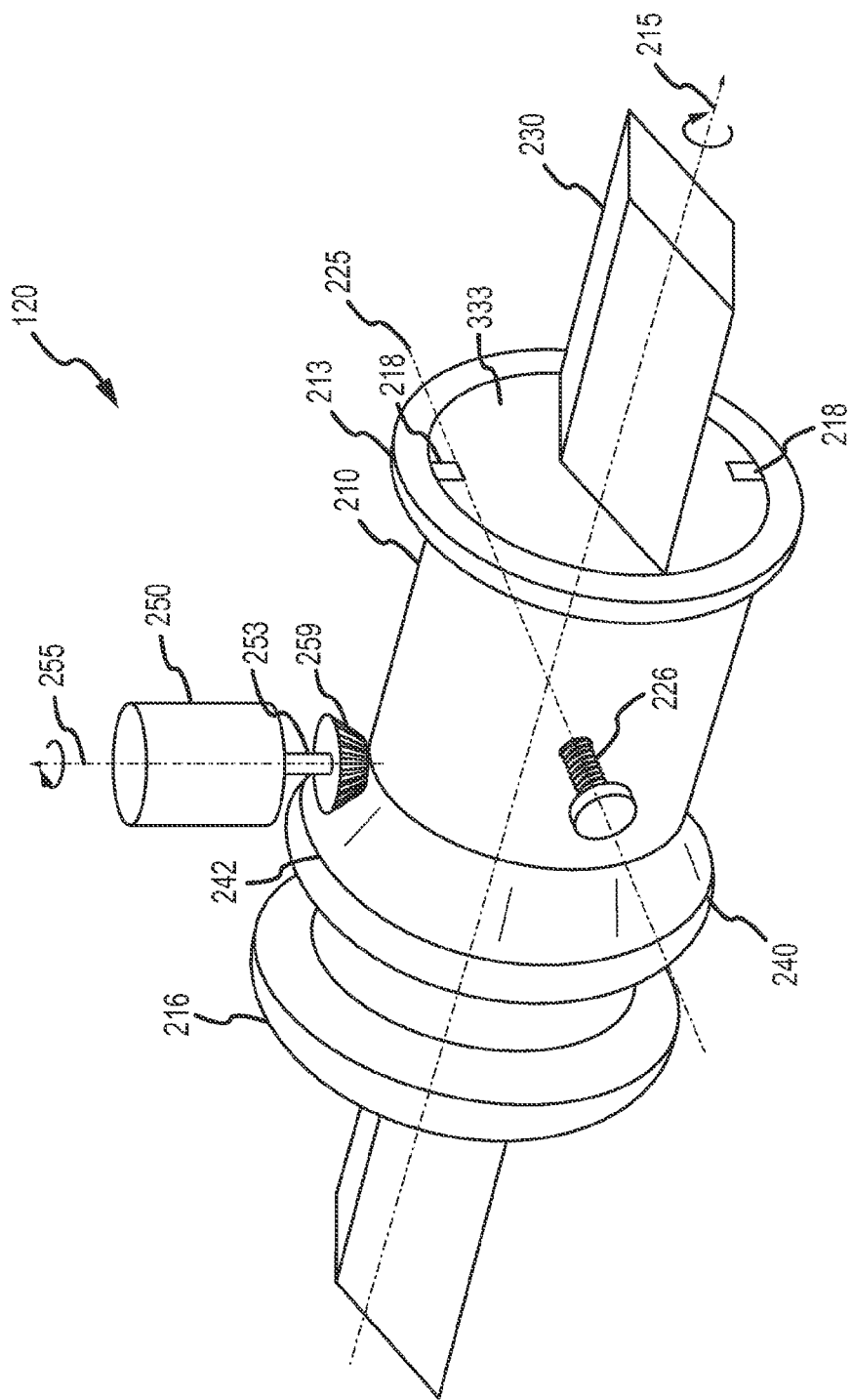
FIG. 4 representatively illustrates a deployment and/or actuation system in a deployed and actuated state in accordance with an exemplary embodiment of the present invention.

Rotational drive system 250 may be suitably configured to rotate pinion module 220 and/or bevel module 240. As generally depicted in FIG. 4, a representative embodiment of the present invention provides an orthographic view for a control surface module 120 in a deployed and actuated state. In this embodiment, bevel module 240 has dynamically meshed with rotational drive system 250 and rotation module 210 has rotated about its principal axis 215 accordingly.

In one embodiment, pinion module 220 may be translated along its principal axis 225 after a specified rotation of pinion module 220 and a corresponding translation of rack module 230. Translation of pinion module 220 may be configured to decouple spur 223 from first surface 256 of rotational drive system 250. With first surface 256 decoupled, second surface 259 of rotational drive system 250 may be configured to translate along the principal axis 255 of rotational drive system 250 as by spring coupled to shaft 253. After translation, second surface 259 may be configured to dynamically couple with bevel module 240 thereby rotating rotation module 210 about the principal axis 215 of rotation module 210. Accordingly, pinion module 220 and rack module 230 may be rotated about the principal axis 215 of rotation module 210. In such an implementation, control surface module 120 may be configured to provide a selectively actuated control surface 232.

Translation of pinion module 220 along its axis 225 may be suitably configured in various embodiments. For example, pinion module 220 may be imparted with an axial force in response to a specified rotation of pinion module 220. Such axial force may be imparted by a mechanical system such as a cam and/or a spring. Such axial force may also be imparted by an electromechanical system such as a solenoid.

Regarding a cam, in one embodiment, spur 223 may comprise a beveled surface having an inclined plane at the intersection between spur 223 and first surface 256. Accordingly, rotation of pinion module 220 would impart translation of pinion module 220 according to the inclined plane. Pinion module 220 may be further fitted with a compliant clip such as a retainer such that translation of pinion module 220 along its axis 225 is substantially restricted once the compliant clip locks within the retainer. In this way, rotation of pinion module 220 about its axis 225 may be configured to impart translation of pinion module 220 along its axis 225. In another embodiment, pinion module 220 may comprise a cam configured to interact with a portion of the housing such that rotation of pinion module 220 imparts translation of pinion module 220. In yet another embodiment, pinion module 220 may be coupled to a cam shaft driven by rotational drive system 250 such that pinion module 220 is translated by the cam shaft.

Regarding a spring, in one embodiment, pinion module 220 may be retained within rotation module 210 with a spring 226. Spring 226 may be compressed in an initial state. After a specified rotation of pinion module 220, the energy stored in spring 226 may be released, as by corresponding threading of pinion module 220 to rotation module 210, thereby translating pinion module 220 along its principal axis 225.

Translation of pinion module 220 may be suitably configured in various embodiments regarding the pinion surface 329 and rack surface 339. For example, pinion surface 329 may be an exterior surface of a sleeve portion of pinion module 220 wherein the sleeve portion is configured to remain substantially fixed within rotation module 210 with respect to translation along the principal axis 225 of pinion module 220. Sleeve portion may be configured to a provide pinion surface 329 that is substantially fixed with respect to translation about the principal axis 225 of pinion module 220. In such an embodiment, problems associated with translation of pinion surface 329 along the principal axis 225 of pinion module 220 may be mitigated.

Translation of second surface 259 may be suitably configured in various embodiments. For example, second surface 259 may comprise a distinct structure configured to translate freely along shaft 253. Second surface 259 may be imparted with an axial force as by a spring positioned along shaft 253 such that second surface 259 dynamically couples with bevel module 240 in response to extension of spring. Such spring may be further configured to accommodate dynamic coupling of pinion module 220 with rotational drive system 250 prior to decoupling of pinion module 220.

The couple between second surface 259 and bevel module 240 may be suitably configured in various embodiments. For example, second surface 259 may comprise a beveled annular surface rotatably coupled to shaft 253 of rotational drive system 250 and bevel module 240 may comprise a corresponding beveled surface 242 disposed substantially annularly around rotation module 210. Second surface 256 and beveled surface 242 may comprise corresponding gear teeth and/or corresponding high friction surfaces. In various embodiments, rotational drive system 250 may be suitably configured to selectively rotate rotation module 210 by virtue of the dynamic couple between rotational drive system 250 and bevel module 240 and the couple between bevel module 240 and rotation module 210.

Dimensions, geometries, and materials for beveled surface 242 and/or second surface 259 may be suitably configured for a given application. For example, in an application featuring rapid rotation of rotation module 210, durability requirements may favor more robust designs and materials. As another example, in an application having a high sensitivity to vibration, the design may be configured to minimize vibration due to dynamic coupling. Taking into account these and other design considerations, beveled surface 242 and/or second surface 259 may comprise any suitable geometries including a substantially conic section, substantially ellipsoidal, substantially polyhedral, substantially toroidal, substantially cylindrical, combinations thereof, and/or the like. Beveled surface 242 and/or second surface 259 may also comprise any suitable dimensions and any suitable materials including alloys, polymers, ceramics, cellulose, combinations thereof, and/or the like.

Figure 5:
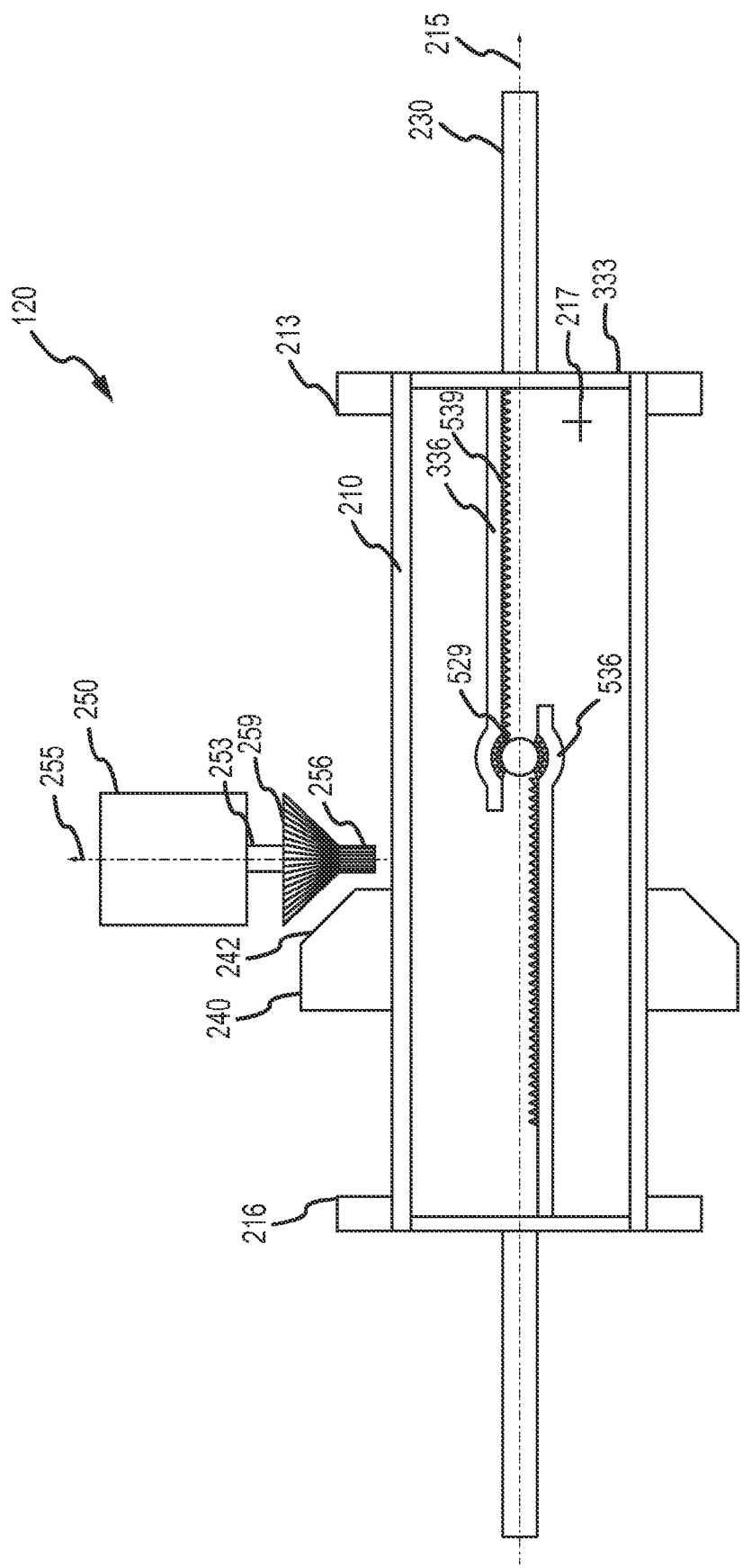
FIG. 5 representatively illustrates a cross-section view of a deployment and/or actuation system in a deployed and actuated state in accordance with an exemplary embodiment of the present invention.

As generally depicted in FIG. 5, a representative embodiment of the present invention provides a cross-sectional view for a control surface module 120 in a deployed and actuated state. In this embodiment, the couple between a plurality of rack modules 230 and a pinion module 220 is visible. Each rack module 230 comprises a rack body 336/536 and rack surface 539. Rack body 336/536 further comprises a rack body recess 529 configured to conform to pinion surface 329 (FIG. 3) in a substantially locked position. Rack surface 539 does not extend into rack body recess 539. Accordingly, the couple between rack body recess 529 and pinion surface 329 acts to restrain rack module 230 about pinion module 220. In this embodiment, deployment of rack module 230 is substantially irreversible. In other embodiments, rack body recess 529 may be omitted to provide substantially reversible deployment of rack module 230.

Control system module 120 may be selectively deployed and/or actuated according to any suitable arrangement. Control surface 232 and rotational drive system 250 may be configured with a specified positional relationship due to the meshing of gear teeth. Control system module 120 may be implemented with a suitably configured Hall Effect sensor coupled to rotational drive system 250 such that rotational drive system 150 may be precisely rotated. An optical encoder and corresponding control systems may be implemented with at least one of rotational drive system 250, rotation module 210, pinion module 220, rack module 230, and bevel module 240 such that the position of a module may be precisely determined. The deployed and/or actuated control surface 232 may be configured to complete a circuit in response to deployment and/or actuation of control surface 232.

As another example, control surface module 120 may be suitably configured for control of various projectiles 105. Control surface module 120 may be implemented to control a projectile 105 without completely de-rolling projectile 105. Alternatively, control surface module 120 may be implemented to control a projectile 105 by at least partially de-rolling projectile 105. Control surface module 120 may be implemented to provide a control surface in a wide range of projectiles 105 ranging from intercontinental ballistic missiles to shoulder fired missiles as well as torpedoes and stationary windmills.

As another example, control surface module 120 may be suitably configured to minimize the weight of projectile 105. Each of the components of control surface module 120 may be comprised of lightweight material and/or designed to minimize the volume of material used. Additionally, control surface module 120 may be suitably configured to deploy and/or actuate a control surface 232 using a single rotational drive system 250, such as suitably configured electric motor.

Figure 6A:
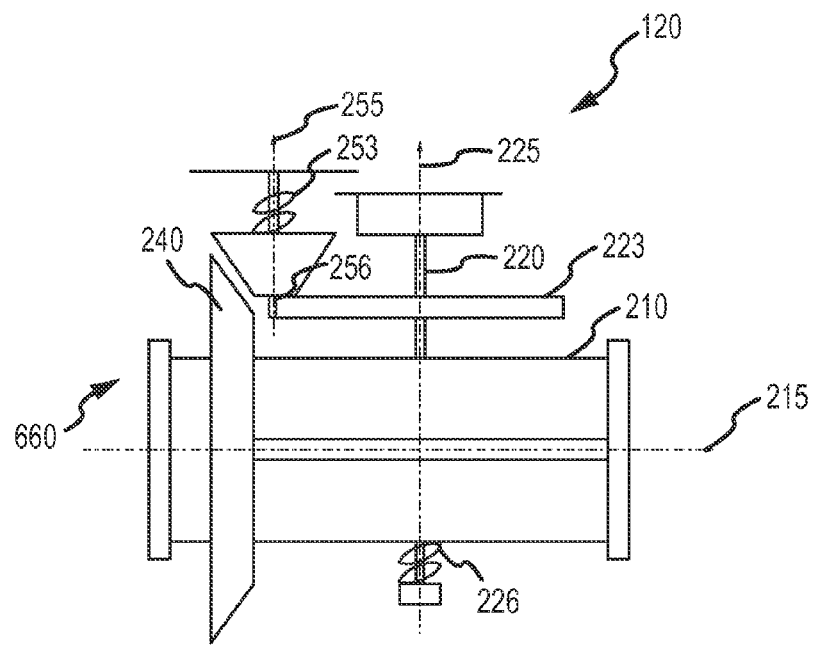
FIGS. 6A and 6B representatively illustrate an alternatively deploying and rotating system in accordance with an exemplary embodiment of the present invention.
Figure 6B:
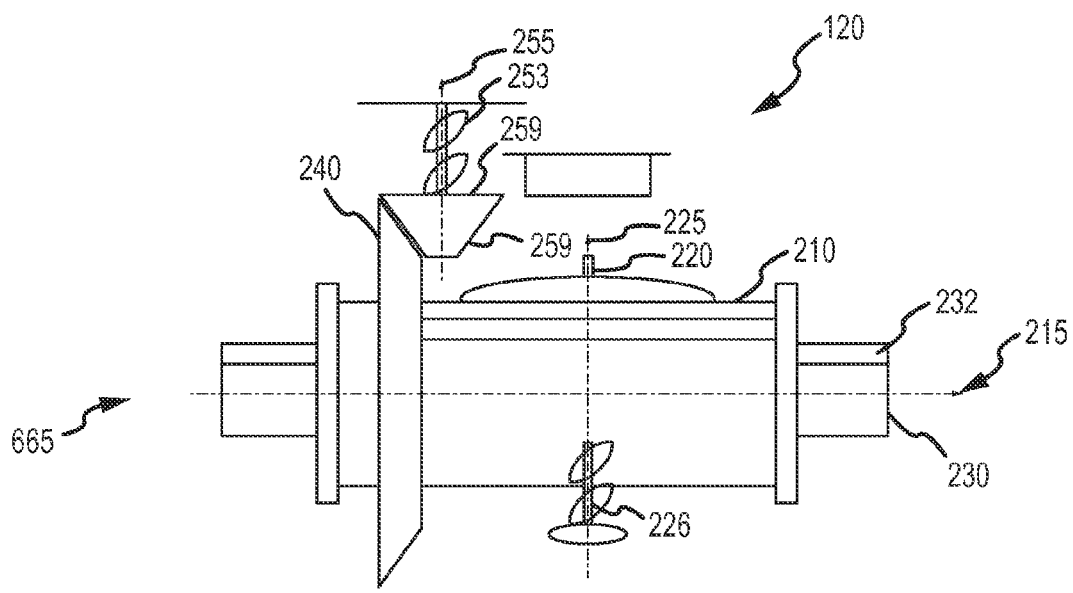
Figure 7:
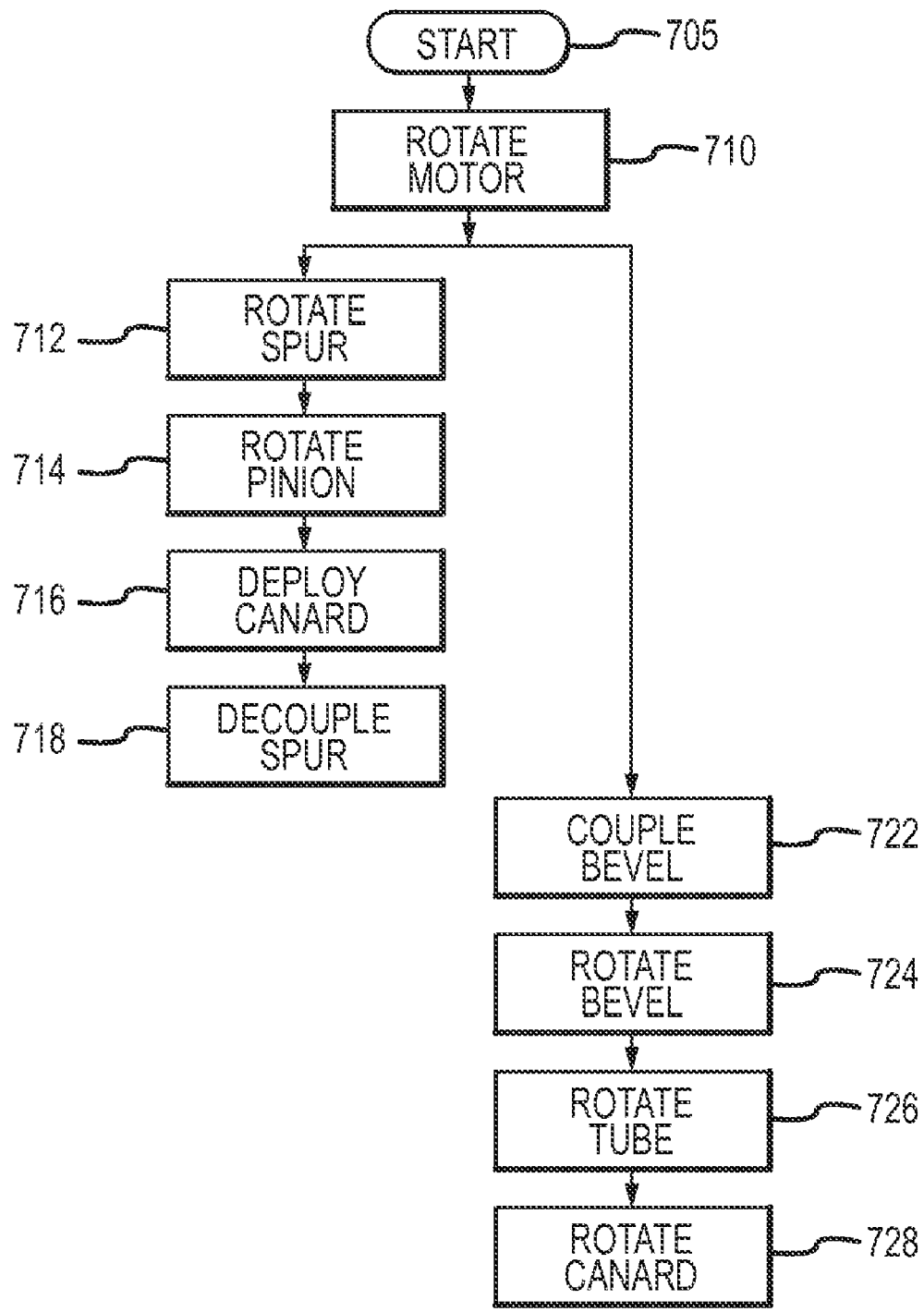
FIG. 7 is a flowchart for an alternatively deploying and rotating system.

Control surface module 120 may be suitably configured for various operational sequences. For example, as generally depicted in FIGS. 6A, 6B, and 7, representative embodiments of the present invention provide an illustration and flow chart, respectively, for an alternatively deploying and rotating control surface module 120. In an initial state 660 (FIG. 6A), pinion module 220 is aligned with rotational drive system 250 and bevel module 240 is decoupled with respect to rotational drive system 250. Accordingly, rack module 230 has not been deployed and rotation module 210 has not been rotated.

In deployment, drive shaft 253 is rotated (710). From an initial state, rotation (710) of drive shaft 253 may be configured to rotate spur 223 (712). Rotation of spur 223 may be configured to rotate pinion module 220 (714). Rotation of pinion module 220 (714) may be configured to deploy control surface 232 (716). Once control surface 232 is deployed (716), spur 223 may be decoupled from drive shaft 253 through translation of pinion module 220 along the principal axis 225 of pinion module 220 (718). Decoupling of spur 223 (718) may be configured to dynamically couple drive shaft 253 and bevel module 240 (722). Once bevel module 240 is dynamically coupled to drive shaft 253, bevel module 240 may be configured to rotate in response to rotation of drive shaft 253 (724). Rotation of bevel module 240 may be configured to rotate rotation module 210 (726). Rotation of rotation module 210 (726) may be configured to rotate control surface 232 (728).

In a deployed and actuated state 665 (FIG. 6B), pinion module 220 may be rotated via rotation module 210 due to dynamic coupling between bevel module 240 and rotational drive system 250. Accordingly, control surface 232 may be deployed and actuated via alternative deployment and actuation.

Figure 8A:
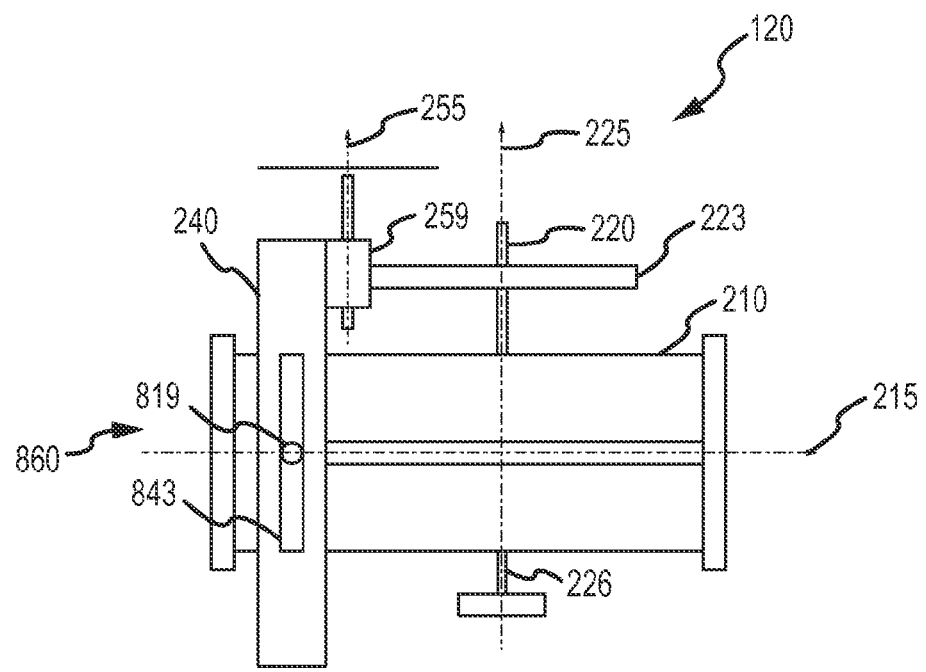
FIGS. 8A and 8B representatively illustrate a simultaneously deploying and rotating system in accordance with an exemplary embodiment of the present invention.
Figure 8B:
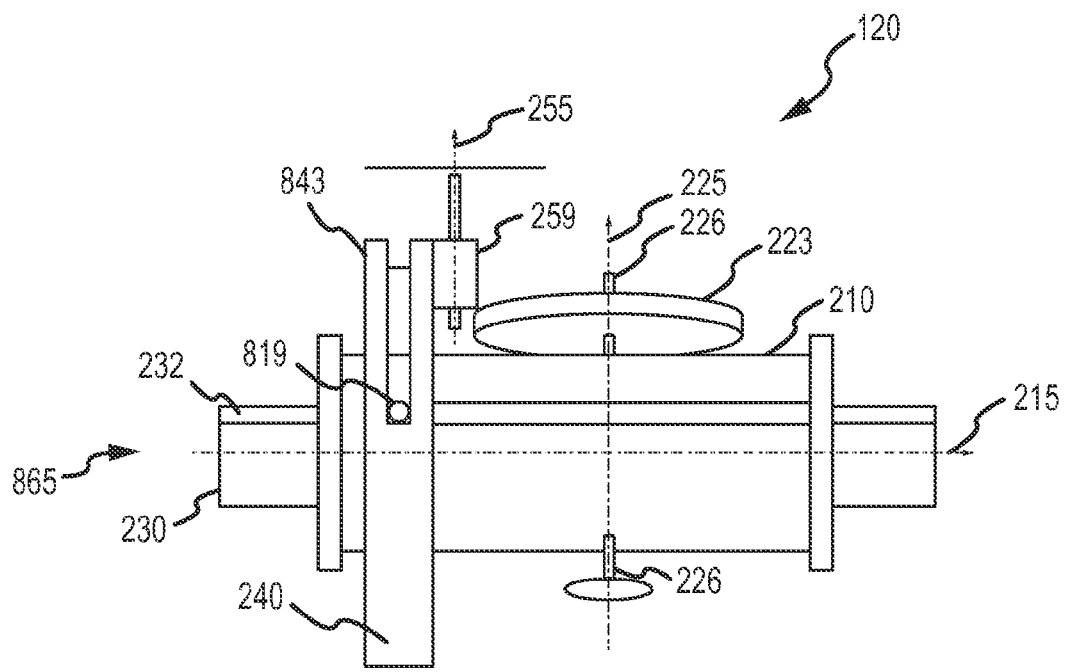
Figure 9:
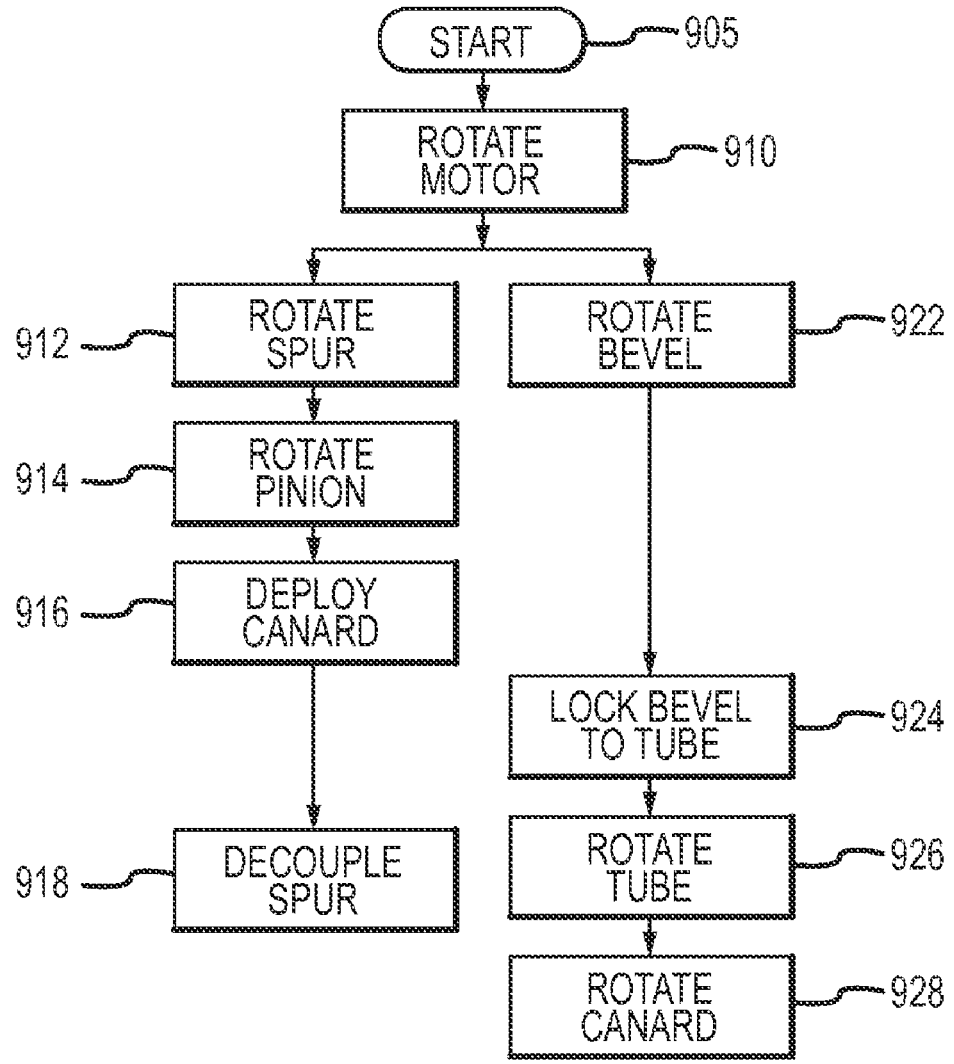
FIG. 9 is a flowchart for a simultaneously deploying and rotating system.

As another example, as generally depicted in FIGS. 8A, 8B, and 9, representative embodiments of the present invention provide an illustration and flow chart, respectively, for a simultaneously deploying and actuating control surface module 120. In an initial state 860 (FIG. 8A), pinion module 220 is aligned with rotational drive system 250, as is bevel module 240. Accordingly, rack module 230 has not been deployed and rotation module 210 has not been rotated.

First, drive shaft 253 is rotated (910). Rotation (910) of drive shaft 253 may be configured to rotate both spur 223 (912) and bevel module 240 (922). Because spur 223 and bevel module 240 are dynamically coupled to drive shaft 253, spur 223 and bevel module 240 may be rotated in response to activation of shaft 253 (912)/(922). Rotation of spur 223 may be configured to impart rotation of pinion module 220 about principal axis of pinion module 225 (914). Rotation of pinion module 220 may be configured to impart deployment of rack module 230 which in turn may be configured to deploy control surface 232 (916). While bevel module 240 may be configured to rotate freely about rotation module 210 over a given interval, eventually bevel module 240 locks to rotation module 210 (924) as by operation of a pin portion 819 of rotation module 210 with slot portion 843 of bevel module 240.

Accordingly, bevel module 240 may be configured to impart rotation of rotation module 210 about the principal axis 215 of rotation module 210 (926). In response to rotation of rotation module 210 (926), spur 223 may be configured to decouple with shaft 253 (918) and accordingly pinion module 220, rack module 230, and control surface 232 may be rotated (928).

In a deployed and actuated state 865 (FIG. 8B), pinion module 220 has been rotated via rotation module 210 due to dynamic coupling between bevel module 240 and rotational drive system 250. Accordingly, control surface 232 may be deployed and actuated via simultaneous deployment and actuation.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

I claim:

1. A mechanical deployment and actuation system, said system comprising:
a rotation module configured to couple to a housing, wherein the rotation module is configured to at least partially rotate about the principal axis of the rotation module relative to the housing;
a pinion module that has a pinion surface, configured to couple to the rotation module, wherein the pinion module is configured to selectively rotate about the principal axis of the pinion module relative to the rotation module;
a rack module that has a rack body with a rack surface, configured to dynamically couple to the pinion module, with the rack surface engaging the pinion surface, wherein the rack module is configured to translate along the principal axis of the rack module in response to rotation of the pinion module; and
a bevel module configured to couple to the rotation module, wherein the bevel module is configured to selectively rotate the rotation module, wherein such rotation of the bevel module at least partially rotates about the principal axis of the rotation module, the rack module and the pinion module,
wherein the system is configured for at least one of deployment in response to rack module translation and actuation in response to bevel module rotation; and
wherein the pinion surface and the rack surface include either or both of 1) corresponding gear teeth and 2) corresponding high friction surfaces.

2. The system according to claim 1, wherein the rotation module comprises at least one of a substantially hollow cylinder and a substantially solid cylinder.

3. The system according to claim 1, wherein the pinion module is disposed substantially normal to the principal axis of the rotation module.

4. The system according to claim 1, wherein the rack module is at least partially enclosed by the rotation module.

5. The system according to claim 1, wherein the bevel module is disposed at least partially annularly with respect to the rotation module.

6. The system according to claim 1, further comprising an electric motor configured to simultaneously rotate the pinion module and bevel module, wherein the bevel module partially freely rotates with respect to the rotation module.

7. The system according to claim 1, further comprising an electric motor configured to alternatively rotate the pinion module and bevel module, wherein the bevel module is substantially fixed with respect to the rotation module.

8. The system according to claim 7,
wherein the pinion module is configured to translate along its principal axis in response to a linear force that is triggered by a pre-determined rotational conformation of the pinion module; and
wherein the shaft of the electric motor comprises a first surface configured to dynamically couple to the pinion module and a second surface configured to dynamically couple to the bevel module,
wherein the second surface is configured to translate along the principal axis of the shaft of the electric motor in response to an at least partially axial force triggered by translation of the pinion module along the principal axis of the pinion module,
wherein the first surface and pinion module are configured to decouple in response to translation of the pinion module, and
wherein the second surface and the bevel module are configured to couple in response to translation of the second surface.

9. The system according to claim 8, wherein the system is implemented to provide a control surface for a projectile.

10. A method for providing a mechanical system, said method comprising the steps of:
providing a rotation module configured to couple to a housing, wherein the rotation module is configured to at least partially rotate about the principal axis of the rotation module relative to the housing;
providing a pinion module that has a pinion surface, configured to couple to the rotation module, wherein the pinion module is configured to selectively rotate about the principal axis of the pinion module relative to the rotation module;

providing a rack module that has a rack body with a rack surface, configured to dynamically couple to the pinion module, with the rack surface engaging the pinion surface, wherein the pinion surface and the rack surface include either or both of 1) corresponding gear teeth and 2) corresponding high friction surfaces, and wherein the rack module is configured to translate along the principal axis of the rack module in response to rotation of the pinion module; and providing a bevel module configured to couple to the rotation module, wherein the bevel module is configured to selectively rotate about the principal axis of the rotation module, wherein such rotation of the bevel module at least partially rotates about the principal axis of the rotation module, rack module, and pinion module; and configuring the system for at least one of deployment in response to rack module translation and actuation in response to bevel module rotation.

11. The method according to claim 10, wherein the rotation module comprises at least one of a substantially hollow cylinder and a substantially solid cylinder.

12. The method according to claim 10, wherein the pinion module is disposed substantially normal to the principal axis of the rotation module.

13. The method according to claim 10, wherein the rack module is at least partially enclosed by the rotation module.

14. The method according to claim 10, wherein the bevel module is disposed at least partially annularly with respect to the rotation module.

15. The method according to claim 10, further comprising:
providing an electric motor configured to simultaneously rotate the pinion module and bevel module, wherein the bevel module partially freely rotates with respect to the rotation module.

16. The method according to claim 10, further comprising:
providing an electric motor configured to alternatively rotate the pinion module and bevel module, wherein the bevel module is substantially fixed with respect to the rotation module.

17. The method according to claim 10,
wherein tie pinion module is configured to translate along its principal axis in response to a linear force that is triggered by a predetermined rotational conformation of the pinion module; and
wherein the shaft of the electric motor comprises a first surface configured to dynamically couple to the pinion module and a second surface configured to dynamically couple to the bevel module,
wherein the second surface is configured to translate along the principal axis of the shaft of the electric motor in response to an at least partially axial force triggered by translation of the pinion module along the principal axis of the pinion module,
wherein the first surface and pinion module are configured to decouple in response to translation of the pinion module, and
wherein the second surface and the bevel module are configured to couple in response to translation of the second surface.

18. The method according to claim 10, further comprising installation of the system within a projectile, and configuring the system to provide a control surface for the projectile.

19. A control surface system for aeronautical and nautical projectiles, said system comprising:

a substantially hollow tube configured to couple to a housing, wherein the tube is configured to at least partially rotate about the principal axis of the tube relative to the housing;

a pinion configured to couple to the tube, wherein the pinion is configured to selectively rotate about the principal axis of the pinion relative to the tube;

a rack configured to dynamically couple to the pinion, wherein the rack is configured to translate along the principal axis of the rack in response to rotation of the pinion, and wherein the rack further comprises a control surface; and a bevel gear configured to couple to the tube, wherein the bevel gear is configured to selectively rotate about the principal axis of the tube, wherein such rotation of the bevel gear at least partially rotates about the principal axis of the tube the rack and the pinion.

20. The system according to claim 19, wherein the pinion is configured along its principal axis in response to a linear force that is triggered by a pre-determined rotational conformation of the pinion; and further comprising:
a projectile comprising a housing, and an electric motor coupled to the housing,
wherein the shaft of the electric motor comprises a first surface configured to dynamically couple to the pinion and a second surface configured to dynamically couple to the bevel gear,
wherein the second surface is configured to translate along the principal axis of the shaft of the electric motor in response to an at least partially axial force triggered by translation of the pinion module along the principal axis of the pinion module,
wherein the first surface and pinion are configured to decouple in response to translation of the pinion, and
wherein the second surface and the bevel are configured to couple in response to translation of the second surface.

21. A mechanical deployment and actuation system located within a housing, the system comprising:
a rotational drive that includes a shaft with a first surface and a second surface;
a pinion module that has a pinion surface;
a rack body that has a rack surface;
a bevel module that has a bevel surface; and
a rotation module that is substantially fixed relative to the bevel module;
wherein the pinion surface engages the rack surface to move the rack body when the pinion module is rotated about a principal axis of the pinion module; and
wherein the shaft is translatable between: 1) a first position in which the first surface of the shaft engages the pinion module, to allow operation of the rotational drive to rotate the piston module about the principal axis of the pinion module; and 2) a second position in which the second surface of the shaft engages the bevel surface, to allow operation of the rotational drive to rotate the bevel module and the rotation module about a principal axis of the rotation module, thereby rotating the rotation module relative to the housing;
wherein the pinion surface and the rack surface include either or both of 1) corresponding gear teeth and 2) corresponding high friction surfaces; and
wherein the second surface and the beveled surface include either or both of 1) corresponding gear teeth and 2) corresponding high friction surfaces.

22. The system of claim 21, wherein the first surface of the shaft engages a spur of the pinion module when the rotational drive is in the first position.

23. The system of claim 22, wherein the first surface is a toothed first surface, and the spur is a spur gear.

24. The system of claim 23,
wherein the second surface of the shaft is a toothed second surface;
wherein the bevel surface is a toothed bevel surface; and
wherein the toothed second surface and the toothed bevel surface when the rotational module is in the second position.

25. The system of claim 22, wherein the pinion module include a spring that pulls the spur out of engagement with the first surface when the pinion surface reaches a rack body recess of the rack body.

26. The system of claim 25, wherein the disengagement of the spur from the first surface automatically causes the second surface to move into engagement with the bevel surface.

27. The system of claim 21,
further comprising a control surface that is mechanically coupled to the rack body;
wherein rotation of the pinion module extends the control surface from the housing; and
wherein rotation of the rotation module rotates the control surface.

* * * * *